Nov. 23, 1926.  
H. A. MENNE  
1,607,839  
BRAKE ATTACHMENT FOR FORD AUTOMOBILES  
Filed June 15, 1925
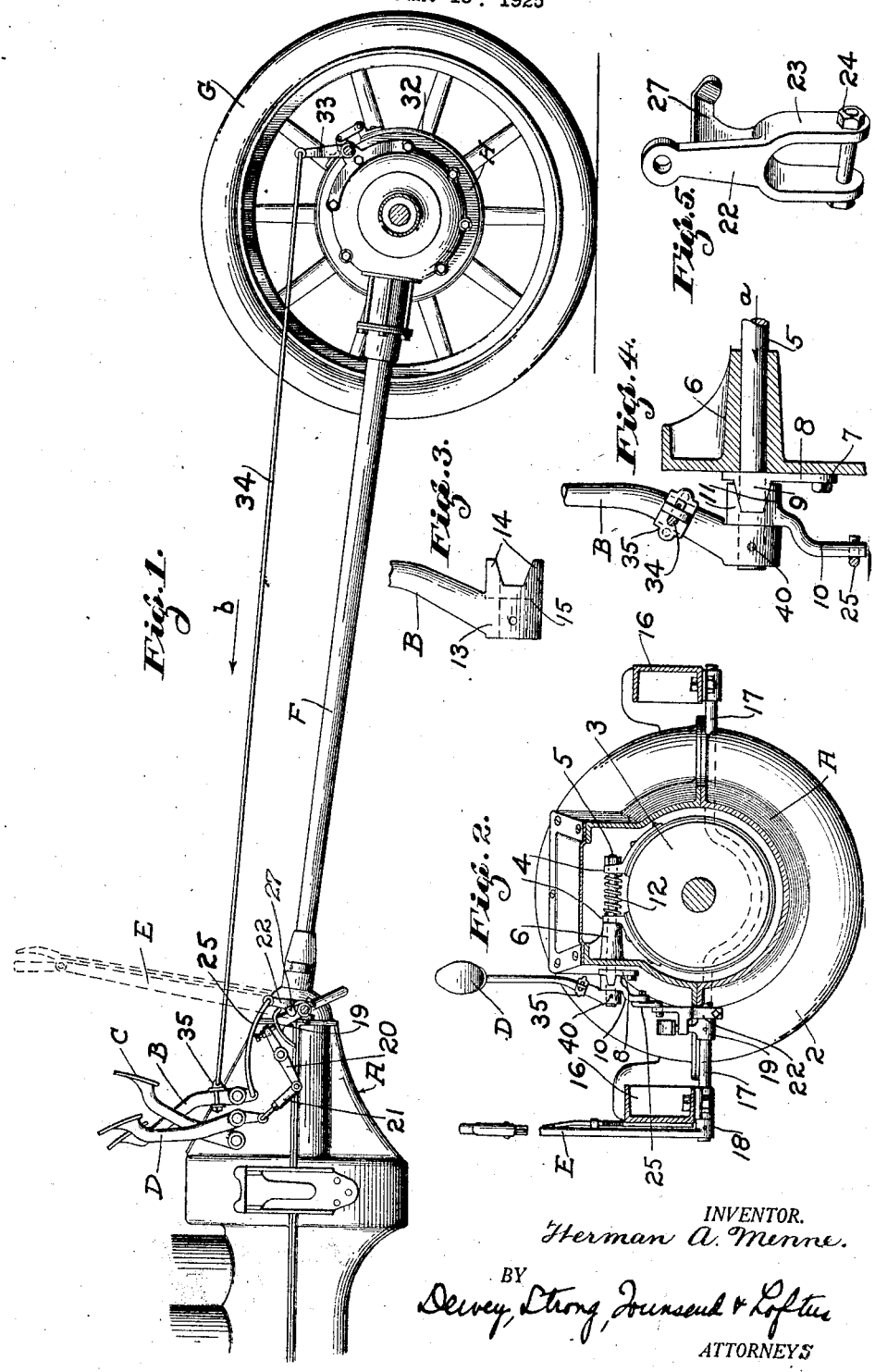
INVENTOR.  
*Herman A. Menne.*  
BY  
*Dewey, Strong, Townsend & Loftus*  
ATTORNEYS Patented Nov. 23, 1926.

1,607,839

UNITED STATES PATENT OFFICE.

HERMAN A. MENNE, OF SAN FRANCISCO, CALIFORNIA.

BRAKE ATTACHMENT FOR FORD AUTOMOBILES.

Application filed June 15, 1925. Serial No. 37,035.

This invention relates to automobile brakes and especially to improvements on the brake mechanism employed in Ford automobiles.

A Ford automobile is equipped with two sets of brakes; to-wit, a service brake and an emergency brake. The service brake consists of a brake band surrounding the transmission drum and actuated by a foot pedal. The emergency brake consists of a hand operated lever which actuates internally expanding drum brakes carried by the rear driving wheel of the automobile. Neither brake is as effective as might be desired, and both are subject to rapid wear.

The object of the present invention is to generally increase the efficiency and wearing qualities of the brake mechanism; first, by applying exterior brake bands on the brake drums; secondly, by connecting the brake bands with the foot pedal so that they may serve as service brakes; and thirdly, by connecting the hand operated lever so that it will actuate the transmission brake drum and thereby permit this to serve as an emergency brake.

One form which the brake mechanism may assume when applied to a Ford automobile is illustrated in the accompanying drawings, in which—

Fig. 1 is a side elevation of the transmission housing propeller shaft and rear driving wheels of a Ford automobile, said side elevation showing the application of the brake mechanism forming the subject matter of the present application.

Fig. 2 is an enlarged cross section of the transmission case of the Ford automobile, said view also showing the application of the improved form of brake mechanism.

Fig. 3 is a detail view showing the lower end of a standard form of brake pedal employed on the Ford automobiles.

Fig. 4 is an enlarged detail view showing the form of brake pedal employed in the brake mechanism forming the subject matter of the present application.

Fig. 5 is a perspective view of an auxiliary lever employed in conjunction with the brake mechanism.

Referring to the drawings in detail and particularly to Fig. 1, A indicates the transmission case of a Ford automobile, B the brake foot-pedal, C the reverse gear pedal, E the emergency brake hand-operated lever, F the propeller shaft, G the rear driving wheels, and H the brake drum carried thereby. The gear transmission drum of a Ford automobile which in this instance in indicated at 2 (see Fig. 2) is surrounded by a brake band 3. The ends of the brake band have lugs 4 secured thereto through which extends the shaft 5. This shaft will hereinafter be referred to as the transmission brake actuating shaft. The shaft is journalled in a bearing 6 forming a part of the transmission housing A and the shaft is so mounted that it may be turned in the bearing and also move longitudinally therein secured on the exterior surface of the transmission case housing as by means of bolt 7, a plate 8 on which is formed a pair of cam lugs 9. Turnably mounted on the shaft 5 is a lever 10 on the hub of which is formed a pair of cam lugs 11. These lugs engage the lugs 9 and when turning movement is transmitted through the lever 10 endwise movement will be transmitted to shaft 5 in the direction of arrow A and the brake band 3 will tighten about the drum 2. Reverse movement of the lever 10 permits re-engagement of the lugs 9 and 11, and shaft 5 is then moved in the opposite direction by means of a spring 12 which is interposed between the lugs 4. The lever 10, together with the lugs 11 which are formed on the hub thereof, forms one of the new features of the present invention. The brake pedal B on the ordinary Ford automobile is provided with a hub 13 and the inner face of this hub is provided with a pair of cam lugs 14 (see Fig. 3); that is, the lugs are cast integrally therewith. These lugs normally engage the stationary lugs 9. Hence, when the foot pedal is depressed, turning movement is transmitted to the hub 13 and the lugs 14 and endwise movement is transmitted to the shaft 5 in the direction of arrow 8. This is the ordinary manner of operating the transmission brake of a Ford automobile. The foot pedal is, however, changed in the present equipment to the extent that the lugs 14 are removed. That is, the hub 13 of the foot pedal is cut with a hack-saw or other suitable tool along the dotted line indicated at 15, and the cam lugs 14 are thus completely removed. This removal of the lugs is necessary in the present instance as the foot brake pedal does not actuate the transmission brake in the present instance but conversely serves the function of actuating the rear drum brake H as will hereinafter be described. The hand lever is depended upon for the actuation of the transmission brake band 3 and this is accomplished as follows: Journalled crosswise of the frame of the Ford automobile which is indicated at 16—16 is a shaft 17 which is commonly referred to as the "controller shaft". The hand operating lever E is secured on the outer end thereof as indicated at 18 and a cam lever 19 is also secured thereon which transmits movement to the clutch lever D through means of a crank arm 20 and a link 21. The cam lever together with the crank arm and the link 21 serves the function of automatically throwing the clutch into neutral position when the emergency brake is applied. That is, the hand lever E is ordinarily connected with the rear brake drums of the automobile as they serve the function of emergency brakes, but in the present instance the brake drum 2 serves the function of an emergency brake and it is therefore essential that the clutch pedal operates in unison therewith. Shaft 17 is provided with an auxiliary lever 22 which is perhaps best illustrated in Fig. 5. The lower end of this lever is forked shaped as at 23 to straddle the shaft 17, and it is secured to said shaft when applied by means of a bolt 24. The upper end of the lever is connected through link 25 with the lower end of the lever 10. Hence, when movement is transmitted to the hand lever E, shaft 17 is turned and lever 22 is rocked in unison therewith. This movement of lever 22 is transmitted through the link 25 to the lever 10 and the hub together with the lugs 11 is thus turned with relation to the stationary lugs 9, thereby causing shaft 5 to move endwise and to tighten the transmission brake band 3. This accordingly serves the function of an emergency brake. It will also be noted that the auxiliary crank arm 22 is provided with a side lug 27. This lug straddles the cam lever 19 and thereby actuates said lever to throw the clutch into neutral position when the transmission brake is applied.

The foot pedal B as previously stated serves only one function in the present instance; to-wit, that of actuating the rear brake drums H. Any suitable type of exterior brake band may be applied as indicated at 32. This may be actuated by lever 33 and this in turn actuated by link 34 which is connected to the foot pedal B as at 35. Hence, if brake pedal B is depressed, movement is transmitted to the link 34 in the direction of arrow b and lever 33 is rocked to tighten the brake bands 32. Foot pedal B accordingly serves the function of a service brake and a powerful and durable brake action is obtained as the two brake bands and drums are simultaneously actuated. The foot brake pedal B is secured on the outer end of the shaft 5 and hence rotates the same when the brake pedal is depressed. Such rotation, however, does not affect the emergency brake mechanism as shaft 5 is freely rotatable in the levers 9 and 10.

The rear brake drums on an ordinary automobile are each provided with two internally expanding cast iron shoes which are operated by means of the hand lever E. These may be entirely removed when the present brake mechanism is installed as exterior brake bands 32 are applied. These exterior brake bands grip the drum on the exterior and as such engage a larger braking surface and furthermore engage the drums at the point of largest diameter, and as such are more efficient than the internally expanding type of brake. Greater power to operate these external brakes is also obtained in the present instance as they are connected with and operated by means of the foot pedal B. Regular braking efficiency is obtained and longer life is supplied as two brakes are in this instance provided to serve the function of a single transmission brake previously employed. This transmission brake will of course remain in the Ford automobile, but it is in this instance actuated by the hand lever E. It thus serves the function of an emergency brake and as this is used comparatively seldom when comparison is made with the service brake, it is obvious that the life of the transmission brake will be enormously increased.

Comparatively few changes are required to install the brake mechanism here illustrated; for instance, it is only necessary to remove the old brake pedal B and to cut or remove the lug members 14 as indicated at Fig. 3. The lever 10 is slipped over the end of the shaft 5 and the old brake pedal with the lugs 14 removed is then applied and secured by a pin 40. This is the only change required in this part of the mechanism.

The controller shaft 17 remains in place and no change is made. As auxiliary lever 22 is forked, it is for this reason merely slipped over the shaft and tightened and it is then connected by means of a link 25 with the lever 10. The old internal expanding drum brakes are removed and replaced by any standard form of external brake, such as indicated at 32, and these brakes are connected with the foot lever B through means of a link 34 and the clamp 35. The change from one brake mechanism to another is thus quickly and readily accomplished and the efficiency of the braking system is materially improved.

While I have shown the preferred form of my invention, as now known to me, I wish it understood that various changes in the construction, combination and arrangement of parts may be made by those skilled in the art without departing from the spirit of the invention as claimed.

Having thus described my invention, what I claim and desire to secure by Letters Patent is—

1. In an automobile of the character described, the combination with the transmission brake actuating shaft and the brake band actuated thereby, of means carried by said shaft whereby longitudinal movement may be imparted to the shaft to tighten the brake band, a pair of brake drums, braking mechanism cooperating therewith, and a foot pedal carried by said shaft from which movement is transmitted to operate the brake mechanism, said foot pedal being operable independent of the means whereby the transmission brake actuating shaft is longitudinally moved.

2. In an automobile of the character described, the combination with the transmission brake actuating shaft and the brake band actuated thereby, of means carried by said shaft whereby longitudinal movement may be imparted to the shaft to tighten the brake band, a pair of brake drums, braking mechanism cooperating therewith, a foot pedal carried by said shaft from which movement is transmitted to operate the brake mechanism, said foot pedal being operable independent of the means whereby the transmission brake actuating shaft is longitudinally moved, and a hand operated lever from which movement is transmitted to actuate the means whereby the transmission brake band is tightened.

3. In an automobile of the character described, a transmission brake drum, a band surrounding the same, a shaft carrying said band and adapted to tighten the band, other means on the shaft for expanding the band, rear driving wheels on the automobile, a brake drum carried by each wheel, brake mechanism cooperating therewith, means carried by the shaft for actuating the transmission drum brake band, and other means carried by said shaft for actuating the brake mechanism cooperating with the rear driving wheel brake drums, said means being operable independent of the transmission brake band actuating mechanism.

4. In an automobile of the character described, a tranmission drum, a brake band cooperating therewith, a shaft supporting said brake band, a lever freely turnable on the shaft and adapted to impart longitudinal movement thereto in one direction to tighten the brake band, other means carried by the shaft for expanding the brake band, rear driving wheels on the automobile, a brake drum on each wheel, a brake band surrounding each drum, a foot pedal on the shaft from which movement may be transmitted to actuate the brake band surrounding the driving wheel brake drums and being operable independently of the freely turnable lever, and a hand operated lever from which movement is transmitted to operate said freely turnable lever on the shaft.

HERMAN A. MENNE.